US012586908B2

(12) United States Patent
Huang et al.

(10) Patent No.: US 12,586,908 B2
(45) Date of Patent: Mar. 24, 2026

(54) TRANSPARENT UNIPLANAR ANTENNA

(71) Applicant: Meta Platforms Technologies, LLC, Menlo Park, CA (US)

(72) Inventors: Wei Huang, San Diego, CA (US); Yasuo Morimoto, Cupertino, CA (US); Jiang Zhu, Cupertino, CA (US); Boon Shiu, Palo Alto, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 93 days.

(21) Appl. No.: 18/421,385

(22) Filed: Jan. 24, 2024

(65) Prior Publication Data

US 2024/0250432 A1 Jul. 25, 2024

Related U.S. Application Data

(60) Provisional application No. 63/481,363, filed on Jan. 24, 2023.

(51) Int. Cl.
*H01Q 9/04* (2006.01)

(52) U.S. Cl.
CPC ........... *H01Q 9/0442* (2013.01); *H01Q 9/045* (2013.01)

(58) Field of Classification Search
CPC ............................. H01Q 9/0442; H01Q 9/045
See application file for complete search history.

(56) References Cited

U.S. PATENT DOCUMENTS

| | | | | |
|---|---|---|---|---|
| 2023/0089629 A1* | 3/2023 | Ouyang | H01Q 1/243 | 343/720 |
| 2023/0094098 A1* | 3/2023 | Kim | H01Q 1/48 | 343/713 |
| 2023/0099558 A1* | 3/2023 | Jung | H01Q 5/385 | 343/713 |
| 2023/0163450 A1* | 5/2023 | Lee | H01Q 1/48 | 343/702 |
| 2023/0231322 A1* | 7/2023 | Jung | H01Q 9/28 | 343/702 |
| 2023/0261357 A1* | 8/2023 | Jung | H01Q 1/48 | 343/713 |
| 2023/0420855 A1* | 12/2023 | Park | H01Q 9/40 | |
| 2024/0014538 A1* | 1/2024 | Park | H01Q 1/52 | |
| 2024/0176135 A1* | 5/2024 | Bang | G02B 27/0172 | |
| 2024/0421492 A1* | 12/2024 | Choi | H01Q 1/38 | |

* cited by examiner

*Primary Examiner* — Thien M Le
(74) *Attorney, Agent, or Firm* — Foley & Lardner LLP

(57) ABSTRACT

The disclosed antenna device may include a substrate and a uniplanar transparent conductive material on the substrate. The uniplanar transparent conductive material may include an active segment, a capacitive active segment to capacitively feed the active segment and separated from the active segment by a dummy segment, and a tuning active segment configured with dimensions to create a substantially 90-degree phase difference between electric field components of two edges the active segment when the antenna device resonates at a desired frequency. Various other methods, systems, and computer-readable media are also disclosed.

20 Claims, 9 Drawing Sheets

310

420

TRANSPARENT UNIPLANAR ANTENNA

CROSS REFERENCE TO RELATED APPLICATION

This application claims the benefit of U.S. Provisional Application No. 63/481,363, filed 24 Jan. 2023, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
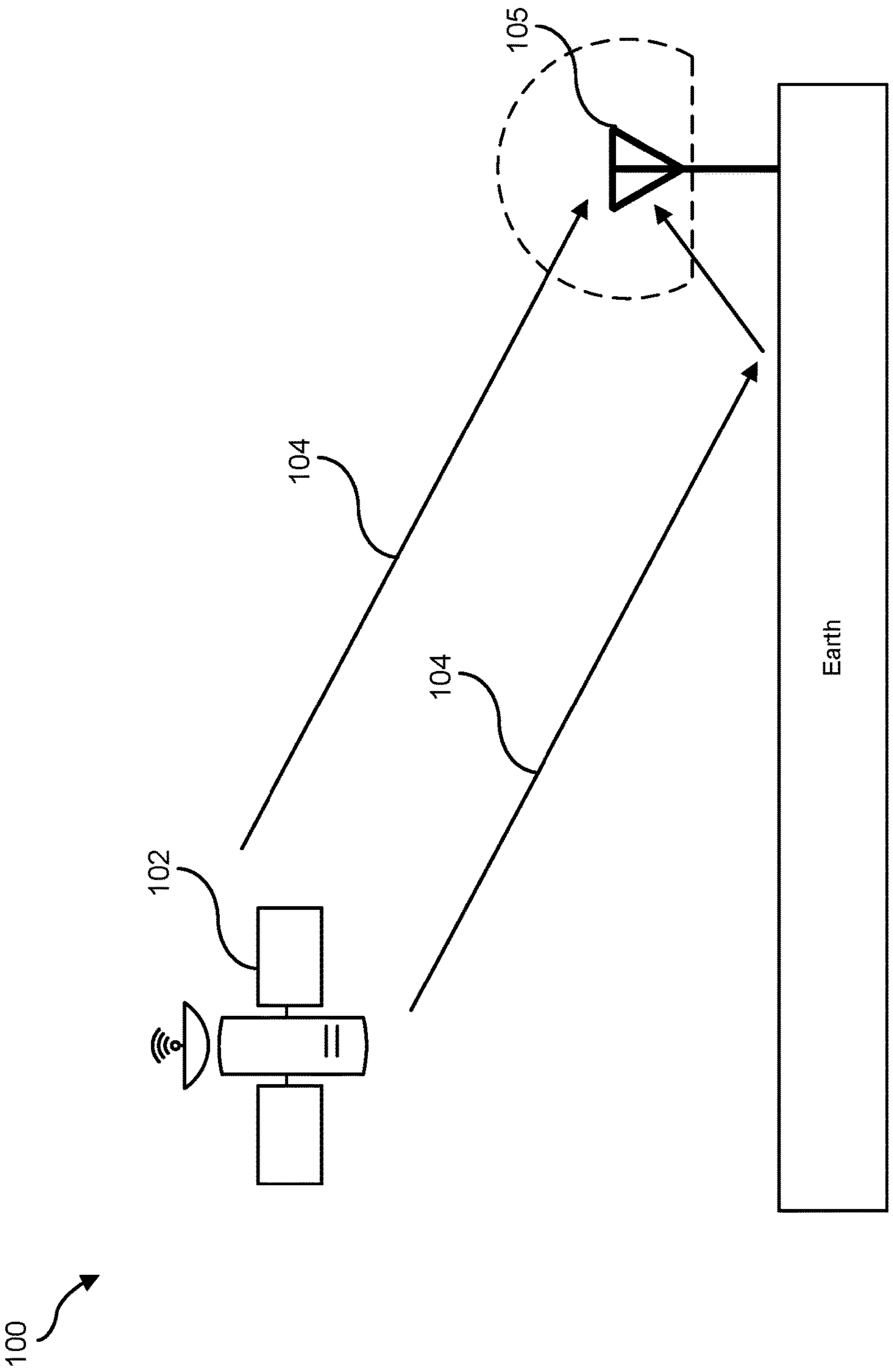
FIG. 1 is a diagram of right hand circular polarized (RHCP) signal use.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Wireless technologies allow computing devices to send and receive signals while being non-stationary. For example, many computing devices may receive signals from global navigation satellite system (GNSS) satellites such as global positioning system (GPS) satellites, to receive geopositioning information even as the devices change locations. Certain devices, such as smartphones and other mobile devices, often change orientation (e.g., with respect to a satellite above) during normal use (e.g., a user may rotate the device from portrait to landscape mode, the user may place the device in a pocket or bag while still using GPS features, etc.). In such cases, linearly polarized (LP) antenna may be preferred, as LP antennas may be rotation-independent. In other scenarios, devices may have generally fixed device orientations (e.g., with respect to the satellite above) such that circularly-polarized (CP) antennas may be used. CP antennas may exhibit reduced distortion from multipath as well as reduced losses from polarization mismatch but are not rotation-independent compared to LP antennas. For example, vehicles may maintain a generally fixed orientation (e.g., with respect to Earth and satellites) during normal use such that CP antennas may be used. Other devices, such as smart glasses or other head-mounted or head-worn devices, may further maintain a generally fixed orientation (e.g., on the user's head with respect to Earth and satellites). However, integrating a CP antenna with such devices may present additional challenges.

The present disclosure is generally directed to a transparent uniplanar antenna. As will be explained in greater detail below, embodiments of the present disclosure may include an antenna formed from a uniplanar transparent conductive material and including an active segment and a dummy segment. The antenna may include a capacitive active segment, separated from the active segment via the dummy segment to capacitively feed the active segment, and a tuning active segment for tuning the active segment. The antenna described herein may advantageously allow a CP antenna of a single layer that may readily be incorporated into a transparent portion of a device, and may further be designed to advantageously allow fabrication of antennas tuned for different frequencies without significant redesign.

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIGS. 1-9, detailed descriptions of systems and methods for a uniplanar transparent antenna. Detailed descriptions of systems and environments for using a uniplanar transparent antenna will be provided in connection with FIGS. 1 and 6-9. Detailed descriptions of an example uniplanar transparent antenna and transparent conductive material will be provided in connection with FIGS. 2-4. In addition, detailed descriptions of an example method for a uniplanar transparent antenna will be provided in connection with FIG. 5.

FIG. 1 illustrates an example environment 100 for a satellite navigation system such as a global navigation satellite system (GNSS) including global positioning system (GPS) satellites or other similar GNSS system. Environment 100 may use signals 104, which in some examples may be circular polarized (CP) signals and more specifically right hand circular polarized (RHCP) signals. Environment 100 may include a satellite 102 (e.g., a device in orbit for relaying signals such as navigation/GPS signals) and an antenna 105 (e.g., a transmission device for sending/receiving signals such as electromagnetic waves). Using RHCP signals may be appropriate when, for instance, an orientation of antenna 105 is generally fixed with respect to a surface of the Earth and/or satellite 102. In other words, antenna 105 may be generally oriented to receive signals 104 from above substantially directly from satellite 102, or from below as reflected off of the Earth's surface. Certain scenarios, such as antenna 105 incorporated in a vehicle, aircraft, head-mounted device, may keep antenna 105 in this orientation such that CP signals may be effectively used.

Figure 2:
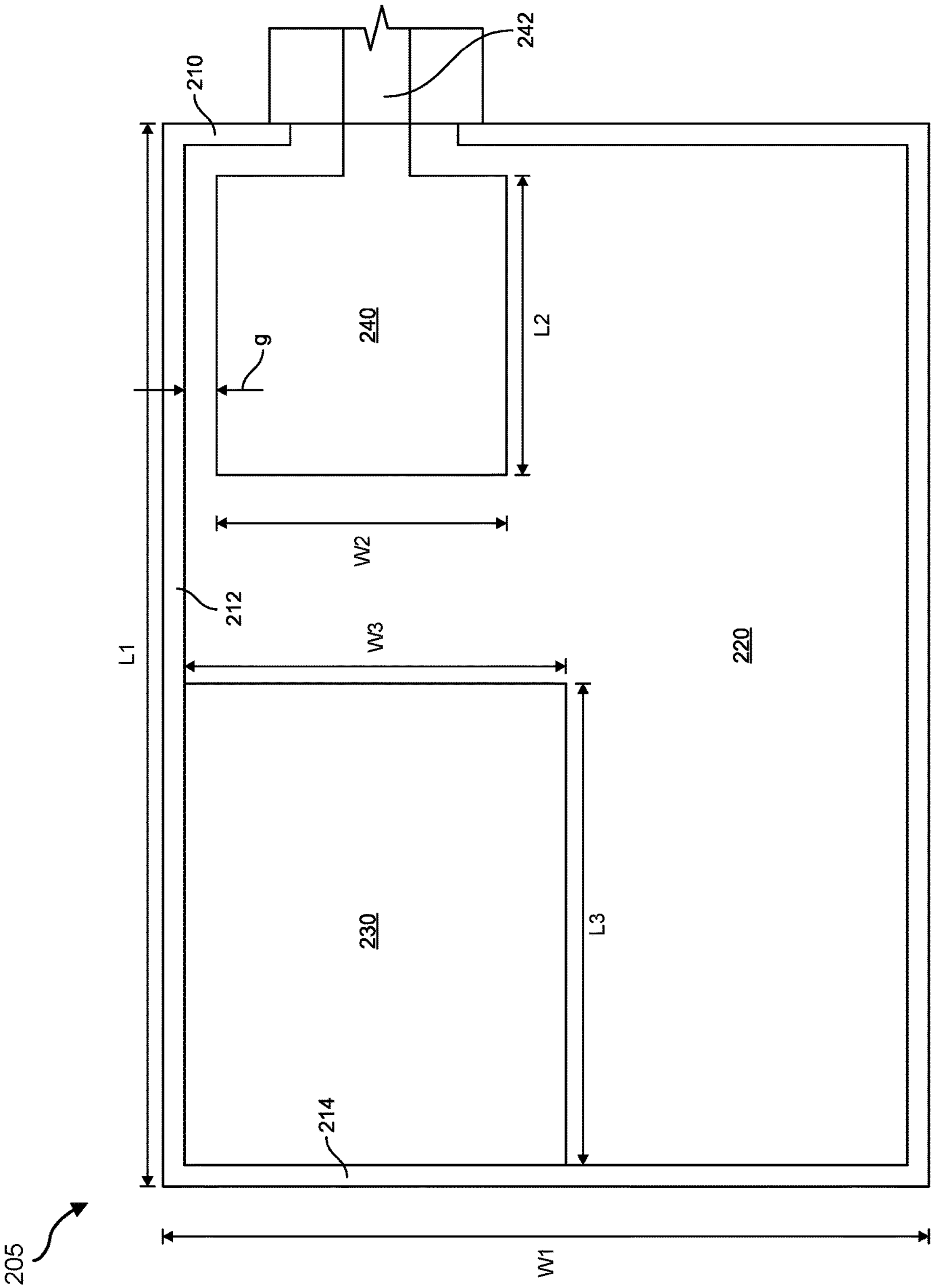
FIG. 2 is a diagram of an exemplary transparent uniplanar antenna.

FIG. 2 illustrates a simplified block diagram of a top-down view of an antenna 205 (corresponding to antenna 105) which can be tuned for CP bands, such as RHCP bands used for GPS (e.g., as in FIG. 1), although in other examples can be tuned for other bands. FIG. 2 illustrates active segments (e.g., segments that are configured to and/or are otherwise capable of conducting current) and dummy segments (e.g., segments that are not configured to and/or are otherwise not capable of conducting current). For example, antenna 205 includes a perimeter active segment 210 having an edge 212 and an edge 214, a tuning active segment 230, and a capacitive active segment 240. Antenna 205 further includes a dummy segment 220.

In some examples, antenna 205 can be made of a transparent conductive material that may be electrically conductive and may be optically transparent to allow human vision therethrough (e.g., such that the transparent conductive material may not significantly block or otherwise obscure human vision). In some examples, antenna 205 may be a lens or otherwise be integrated into an eyepiece of a device (see, e.g., FIG. 8). Moreover, antenna 205 may be uniplanar (e.g., made of a single active layer on a single plane which in some examples may be on a substrate and/or sandwiched between protective and/or structural support layers) such that the active segments (e.g., perimeter active segment 210, tuning active segment 230, and capacitive active segment 240) and dummy segments (e.g., dummy segment 220) may be made from a single layer of material of appropriate thickness and/or otherwise correspond to a single plane.

Figure 3:
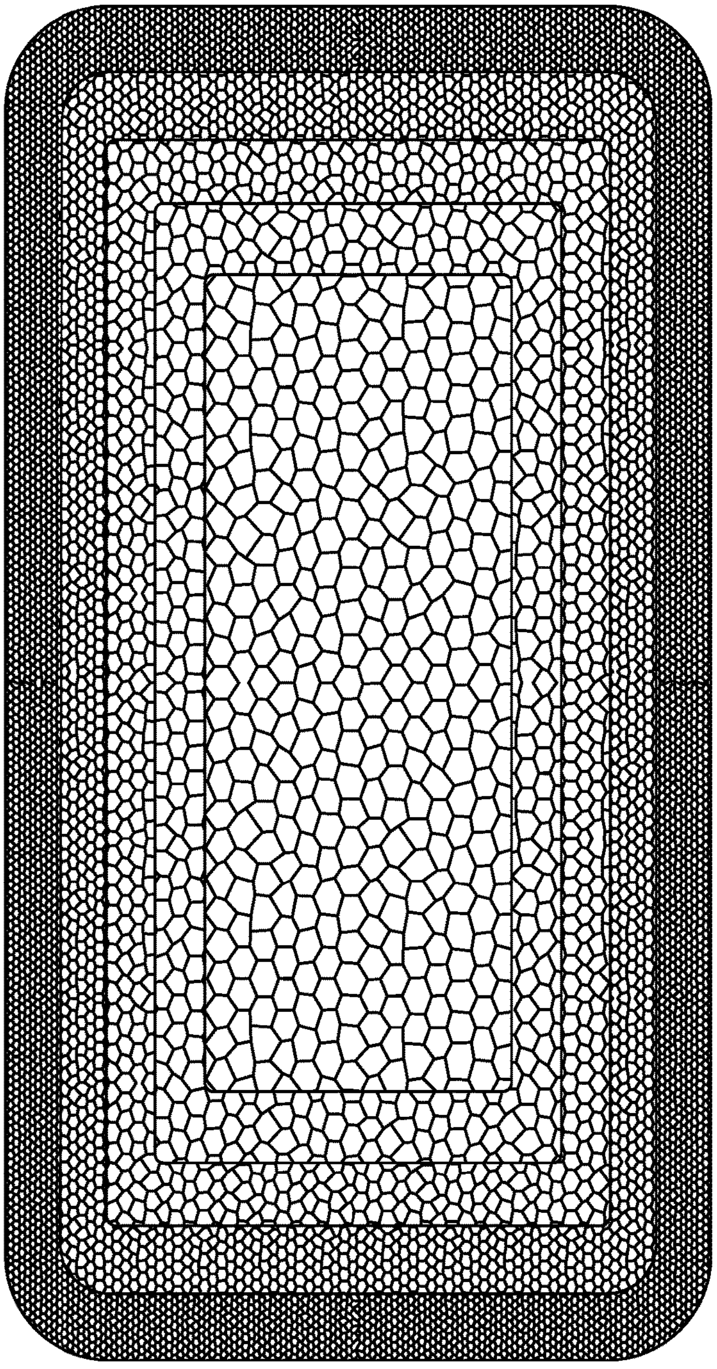
FIG. 3 is a diagram of an exemplary metal mesh material.
Figure 4:
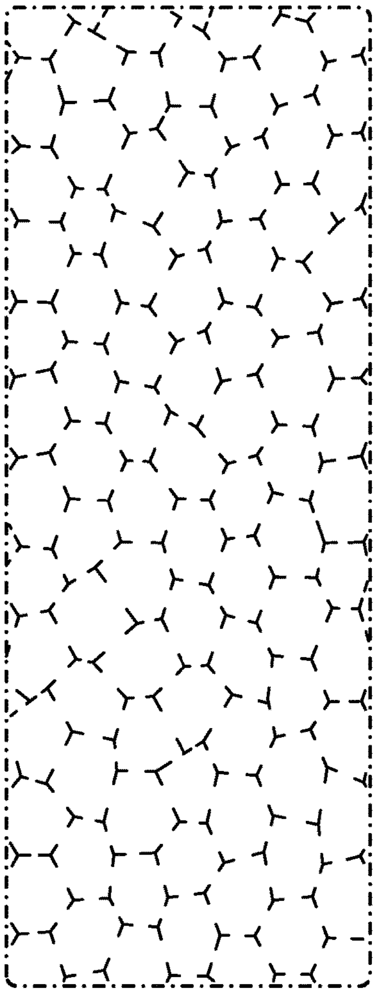
FIG. 4 is a diagram of an exemplary floating metal mesh material.

One example of a transparent conductive material is illustrated in FIGS. 3 and 4. A transparent conductive material 310 can correspond to a metal mesh material, which in some examples is a metal and/or other conductive material(s) arranged in a lattice (e.g., mesh) of cells. More specifically, walls of the cells may be made of the conductive material whereas interior regions of the cells (as defined by the walls) may be empty/hollow or otherwise filled with clear/transparent material. Such a structure may appear optically transparent to a human eye. For instance, a density of the metal mesh (e.g., corresponding to cell size and/or wall thickness) may be such that when near a human eye (e.g., as incorporated in an eye piece of a device as normally worn), the transparent conductive material can appear transparent or otherwise does not obscure or obfuscate human vision.

In some examples, as illustrated in FIG. 3, the cells may be in a closed-circuit structure or otherwise have connected cell walls. Such a structure may allow conductivity, for instance allowing electrical conductance through transparent conductive material 310 when further connected in a circuit.

As illustrated in FIG. 3, a density of transparent conductive material 310 may vary. FIG. 3 illustrates a denser density (e.g., smaller cell sizes and/or thicker wall) around a perimeter which may have increased conductivity with reduced optical transparency as compared to progressively less denser densities (e.g., larger cell sizes and/or thinner walls) towards a center in FIG. 3 that may have reduced conductivity with increased optical transparency.

FIG. 3 further illustrates an example arrangement and transition of densities, although in other examples, other patterns, transitions, and/or arrangements of densities may be used. For example, FIG. 3 includes borders between portions of different densities for illustrative purposes, although in other examples, transitions between densities may be more gradual (e.g., a gradual shift in cell sizes and/or wall thicknesses). In addition, FIG. 3 illustrates example lattice/cell structures, which may vary (e.g., having different cell shapes, repeat with different shapes/sequences, etc.) and in further examples vary based on desired density. Moreover, the material may be substantially uniform or may also vary (e.g., based on desired density, cell size, etc.). In yet further examples, a density can correspond to a solid and/or nearly solid structure that may not by substantially optically transparent in order to maximize conductivity. For instance, a perimeter and/or border area (e.g., perimeter active segment 210) of an optical device, which may not require optical transparency for use as compared to central portions, may be solid for increased conductivity, and may transition into less dense densities for optical transparency.

Transparent conductive material 310 may correspond to active segments (e.g., perimeter active segment 210, tuning active segment 230, and capacitive active segment 240) by having the cell structures being interconnected (e.g., having connected walls) allowing for conductivity (e.g., corresponding to closed/completed circuits). FIG. 4 illustrates a transparent material 420 corresponding to dummy segments (e.g., dummy segment 220). As illustrated in FIG. 4, transparent material 420 may be similar to transparent conductive material 310 (e.g., made of similar materials, having similar shapes/structures, capable of being configured in similar densities, similar optically transparent properties, etc.). However, as illustrated in FIG. 4, transparent material 420 may have a floating configuration such that the cells are in an open circuit structure or are otherwise open (e.g., the walls have precise incisions or otherwise formed to be disconnected). FIG. 4 illustrates an example configuration, although in other examples, other configurations (e.g., other gaps/incisions, different regularity and/or pattern of incisions, gaps formed without incisions, etc.). Accordingly, even if transparent material 420 is made of conductive material and connected to a circuit, the floating configuration may reduce conductivity to effectively be non-conductive (e.g., corresponding to open/incomplete circuits). This arrangement allows transparent conductive material 310 and transparent material 420 to be co-fabricated (e.g., on a single common layer), and patterned into desired arrangements to have conductive (e.g., active) portions and non-conductive (e.g., dummy) portions.

Returning to FIG. 2, the active segments (e.g., perimeter active segment 210, tuning active segment 230, and capacitive active segment 240) and dummy segments (e.g., dummy segment 220) may be made of a single layer of a transparent conductive material as described herein. The transparent conductive material may be a continuous layer (e.g., of a length L1 and width W1 and having an appropriate layer thickness that may be substantially uniform or may vary) having different densities forming different shapes as desired, and further comprising interconnected and/or floating portions as desired to form active and/or dummy segments. For example, antenna 205 may be made of a single continuous metal mesh layer with denser segments around the perimeter (e.g., perimeter active segment 210), same and/or different densities forming other active segments (e.g., tuning active segment 230 and/or capacitive active segment 240), and dummy segments (e.g., dummy segment 220) of floating mesh between the active segments and within the perimeter, as illustrated in FIG. 2. In one example, a desired metal mesh pattern (e.g., having desired densities for the active regions) may be deposited, and dummy segments formed through incisions in the metal mesh outside of the active segments. In other examples, other arrangements may be used.

In some examples, perimeter active segment 210 may be configured for producing electric fields appropriate for desired signals. For example, for CP (and more specifically RHCP) signals, perimeter active segment 210 may be configured such that a majority of surface currents at two sides or edges (e.g., edge 212 and corresponding opposite edge, each having a length corresponding to L1 and an appropriate width) are substantially perpendicular to those of the other two sides or edges (e.g., edge 214 and corresponding opposite edge, each having a length corresponding to W1 and an appropriate width). In other words, a current through edge 212 may be substantially orthogonal to a current through edge 214. In some examples, perimeter active segment 210 may be more dense than other segments (e.g., having a densest density), which may further correspond to being solid. In addition, as illustrated in FIG. 2, perimeter active segment 210 may at least partially surround other segments (e.g., tuning active segment 230, capacitive active segment 240, and/or dummy segment 220), although in other examples other arrangements may be used.

Capacitive active segment 240 may be coupled to a transmission structure (e.g., a coplanar waveguide (CPW) or other appropriate structure) via a waveguide transmission line 242 (e.g., corresponding to a signal strip between two ground sections) to capacitively feed perimeter active segment 210, although in other examples waveguide transmission line 242 may correspond to any other appropriate transmission line coupled to a corresponding signal source/receiver. Accordingly, dummy segment 220 may surround capacitive active segment 240 so as to conductively separate capacitive active segment 240 from perimeter active segment 210 (e.g., by at least a distance g) yet allow capacitive active segment 240 to be capacitively coupled to perimeter active segment 210. Further, capacitive active segment 240 may have desired dimension (e.g., a length L2 and a width W2 and in some examples a desired metal mesh density) as appropriate for the CPW. Thus, a CPW feed may electrically excite antenna 205 (e.g., via capacitive active segment 240 which may capacitively feed perimeter active segment 210).

In some examples, when antenna 205 is resonating at a desired frequency, having a 90 degree phase different between two orthogonal electric field components (e.g., corresponding to edge 212 and edge 214 and/or respective opposite edges) may be desired, which in some examples may be achieved via tuning active segment 230 having desired dimensions (e.g., a length L3 and a width W3 and in some examples a desired metal mesh density). As illustrated in FIG. 2, tuning active segment 230 may be located at a corner of perimeter active segment 210 (e.g., where edge 212 meets edge 214) and having edges substantially parallel to the edges of perimeter active segment 210 such that the edges of tuning active segment 230 may be substantially connected along and/or integrated with portions of edge 212 and edge 214. In other words, the dimensions of tuning active segment 230 may be selected to achieve a desired CP band, which in some examples allows other antenna parameters to be constant. For instance, multiple iterations of antenna 205 may be fabricated with similar L1, W1, (e.g., for the antenna dimensions) and L2, W2 (e.g., for capacitive active segment 240), while varying L3, W3 (e.g., for tuning active segment 230) by adjusting how dummy segment 220 is formed (e.g., incisions in the metal mesh) to produce antennas for different CP bands. Moreover, in other examples, other desired phase differences and/or electric field properties (e.g., at desired frequencies) may be tuned by varying the dimensions of tuning active segment 230.

FIG. 2 illustrates active segments having generally rectangular shapes, although in other examples, other appropriate shapes may be used, for example as desired based on desired signals and signal/electrical properties. Further, additional iterations and/or arrangements of the segments (e.g., perimeter active segment 210, dummy segment 220, tuning active segment 230, capacitive active segment 240, and/or waveguide transmission line 242) may be used. In addition, although antenna 205 is uniplanar such that each of its components (e.g., at least perimeter active segment 210, dummy segment 220, tuning active segment 230, capacitive active segment 240, and/or waveguide transmission line 242) are generally coplanar and/or correspond to a single layer, in some examples the components may have different layer thicknesses, and further, the single layer may not be flat (e.g., the shared plane may be curved and/or have curved portions which may coincide with one or more of the components).

Figure 5:
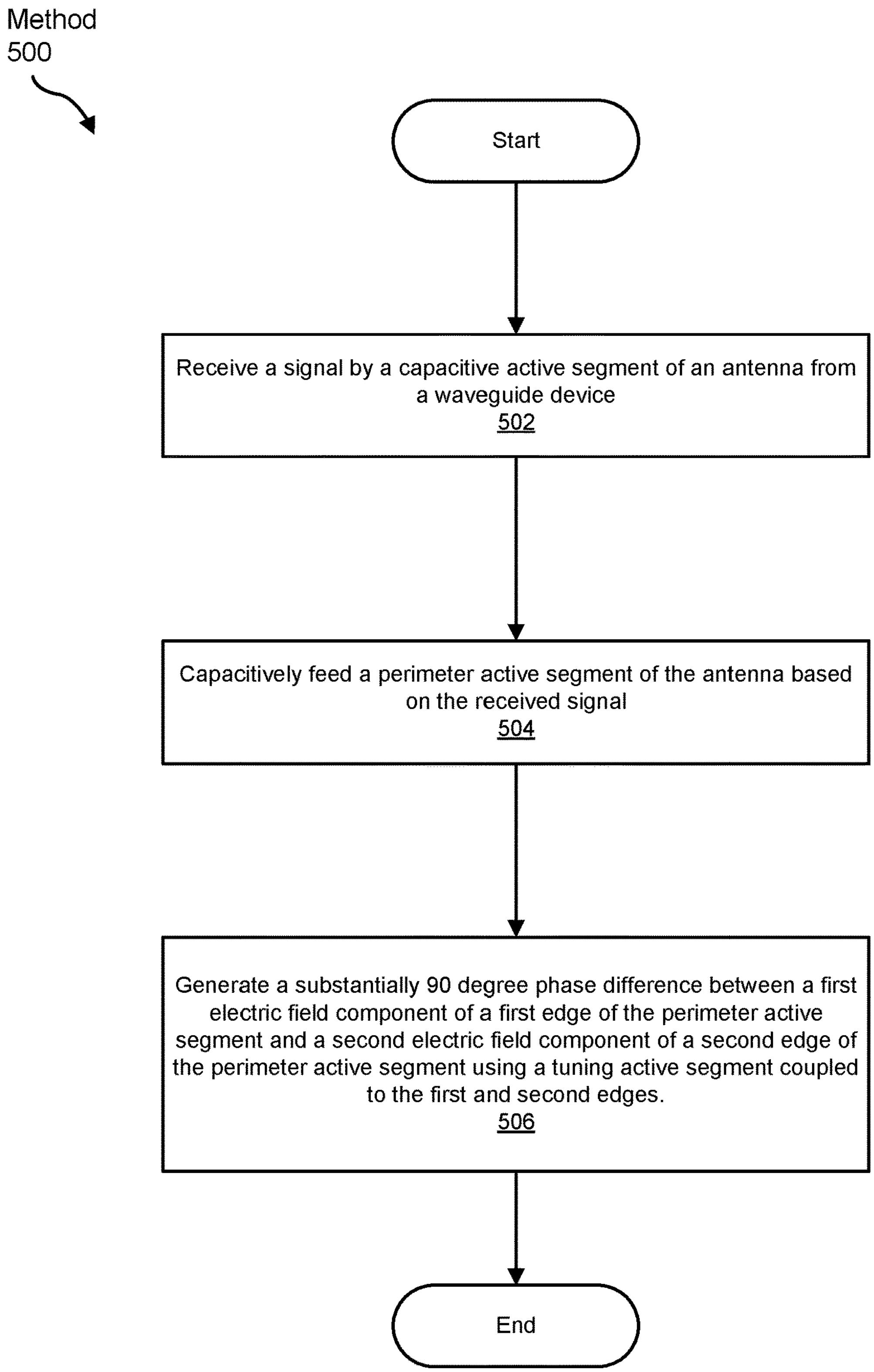
FIG. 5 is a flow diagram of an exemplary method for a transparent uniplanar antenna.

FIG. 5 is a flow diagram of an exemplary computer-implemented method 500 for using a transparent uniplanar antenna. The steps shown in FIG. 5 may be performed by any suitable device and/or computing system, including the system(s) illustrated in FIGS. 1, 2, 6, 7, 8, and/or 9. In one example, each of the steps shown in FIG. 5 may represent an algorithm whose structure includes and/or is represented by multiple sub-steps, examples of which will be provided in greater detail below.

As illustrated in FIG. 5, at step 502 one or more of the systems described herein may receive a signal by a capacitive active segment of an antenna from a waveguide device. For example, perimeter active segment 210 may receive a signal by capacitive active segment 240 from waveguide transmission line 242.

Figure 6:
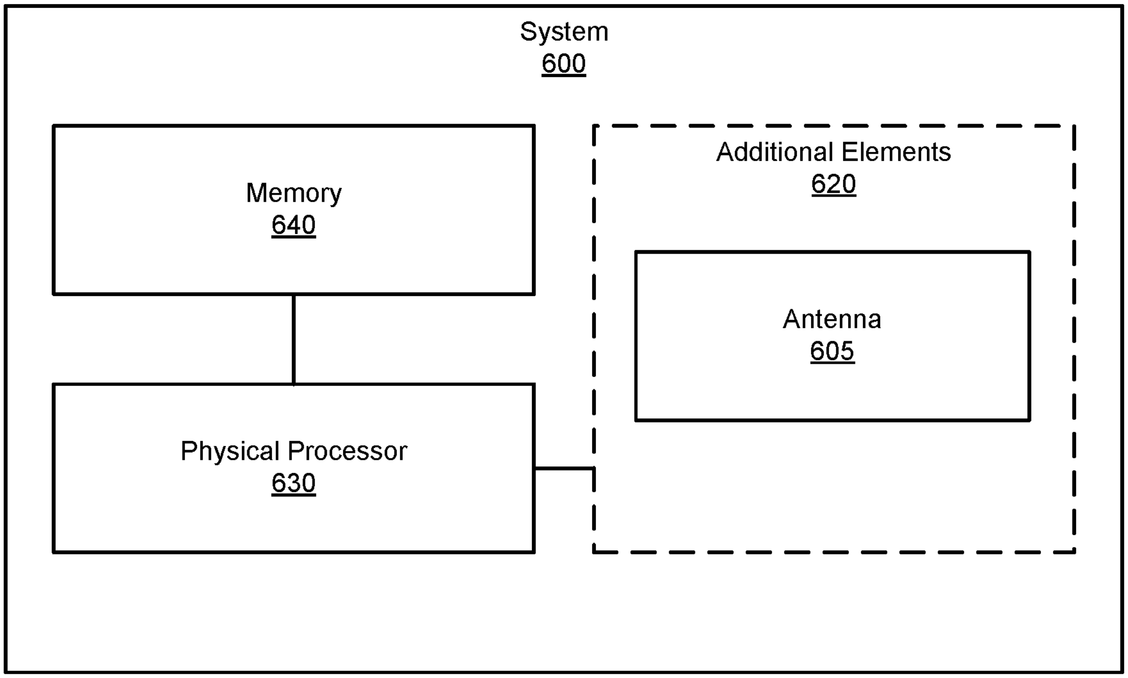
FIG. 6 is a block diagram of an exemplary system for a transparent uniplanar antenna.

Various systems described herein may perform step 502. FIG. 6 is a block diagram of an example system 600 for a transparent uniplanar antenna (e.g., antenna 205). System 600 may correspond to a client device or user device, such as an artificial reality system (e.g., augmented-reality system 800 in FIG. 8, virtual-reality system 900 in FIG. 9), a desktop computer, laptop computer, tablet device, smartphone, or other computing device. As illustrated in this figure, example system 600 may include one or more memory devices, such as memory 640. Memory 640 generally represents any type or form of volatile or non-volatile storage device or medium capable of storing data and/or computer-readable instructions. In one example, memory 640 may store, load, and/or maintain one or more instructions. Examples of memory 640 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory. Memory 640 may include instructions that represent one or more software applications or programs that, when executed by a computing device, may cause the computing device to perform one or more tasks. For example, the instructions may be configured to run on one or more computing devices, such as the devices illustrated in FIG. 7 (e.g., computing device 702 and/or server 706).

As illustrated in FIG. 6, example system 600 may also include one or more physical processors, such as physical processor 630. Physical processor 630 generally represents any type or form of hardware-implemented processing unit capable of interpreting and/or executing computer-readable instructions. In one example, physical processor 630 may access and/or modify one or more of the instructions stored in memory 640. Additionally or alternatively, physical processor 630 may execute one or more of the instructions to perform specific tasks, and/or represent specialized processors for performing the specific tasks. Examples of physical processor 630 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 6, example system 600 may also include one or more additional elements 620, such as an antenna 605 corresponding to a transparent uniplanar antenna (e.g., antenna 205) as described herein. Antenna 605 may be used for GPS signals (e.g., as described with respect to FIG. 1) or any other desired signals/bands.

Example system 600 in FIG. 6 may be implemented in a variety of ways. For example, all or a portion of example system 600 may represent portions of example network environment 700 in FIG. 7.

Figure 7:
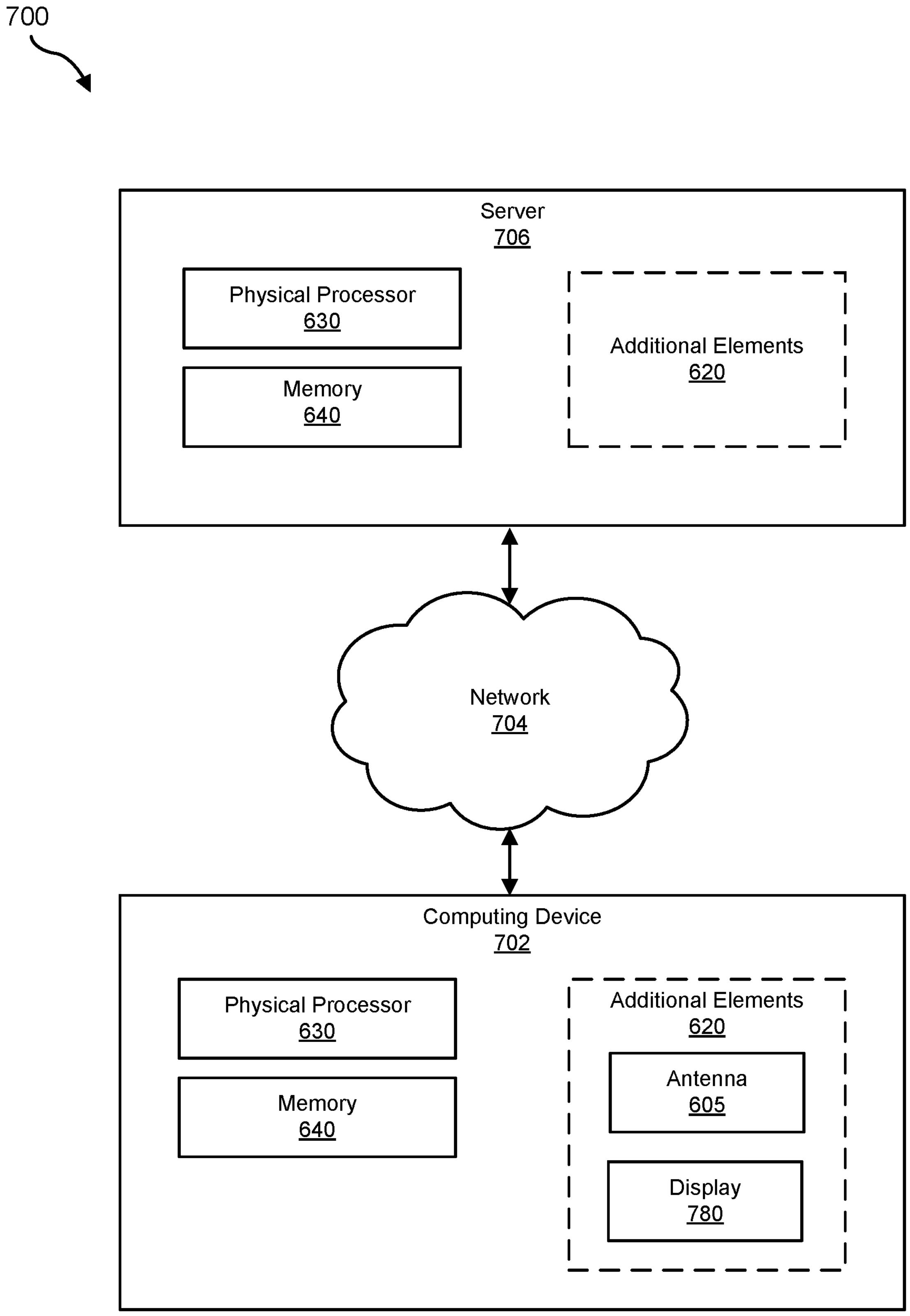
FIG. 7 is a block diagram of an exemplary network for a computing device with a transparent uniplanar antenna.

FIG. 7 illustrates an exemplary network environment 700 implementing aspects of the present disclosure. The network environment 700 includes computing device 702, a network 704, and server 706. Computing device 702 may be a client device or user device, such as an artificial reality system (e.g., augmented-reality system 800 in FIG. 8, virtual-reality system 900 in FIG. 9), a desktop computer, laptop computer, tablet device, smartphone, or other computing device. Computing device 702 may include a physical processor 630, which may be one or more processors, memory 640, which may store data such as one or more of additional elements 620, antenna 605, and a display 780. In some implementations, computing device 702 may represent an augmented reality device such that display 780 overlays images onto a user's view of his or her local environment. For example, display 780 may include a transparent medium (e.g., a transparent conductive material as described herein) that allows light from the user's environment to pass through such that the user may see the environment. Display 780 may then draw on the transparent medium to overlay information. Alternatively, display 780 may project images onto the transparent medium and/or onto the user's eyes. In some examples, antenna 605 may be integrated with display 770.

Additional elements 620 may include one or more sensors, such as a microphone, an inertial measurement unit (IMU), a gyroscope, a GPS device, etc., and other sensors capable of detecting features and/or objects in the environment. Computing device 702 may be capable of collecting various inputs using the sensor(s) for sending to server 706.

Server 706 may represent or include one or more servers or other computing devices (e.g., desktop computer, a companion device to computing device 702, etc.) capable of hosting aspects of an artificial reality environment, although in some examples computing device 702 may host all or some aspects of the artificial reality environment without requiring server 706. Server 706 (and/or computing device 702) may in some examples, track user positions in the artificial reality environment using signals from computing device 702. Server 706 may include a physical processor 630, which may include one or more processors, memory 640, which may store program instructions, and one or more of additional elements 620.

Computing device 702 may be communicatively coupled to server 706 through network 704. Network 704 may represent any type or form of communication network, such as the Internet, and may comprise one or more physical connections, such as LAN, and/or wireless connections, such as WAN.

Turning back to FIG. 5, the systems described herein may perform step 502 in a variety of ways. In one example, a capacitive active segment of antenna 605 may receive a signal via a waveguide device or other transmission line.

At step 504 one or more of the systems described herein may capacitively feed a perimeter active segment of the antenna based on the received signal. For example, the capacitive active segment of antenna 605 may capacitively feed a perimeter active segment of antenna 605.

The systems described herein may perform step 504 in a variety of ways. In one example, capacitive active segment 240 may capacitively feed perimeter active segment 210 as described herein.

At step 506 one or more of the systems described herein may generate a substantially 90 degree phase difference between a first electric field component of a first edge of the perimeter active segment and a second electric field component of a second edge of the perimeter active segment using a tuning active segment coupled to the first and second edges. For example, a tuning active segment of antenna 605 may allow the perimeter active segment of antenna 605 to generate a substantially 90 degree phase difference between electric field components of connected edges of antenna 605.

The systems described herein may perform step 506 in a variety of ways. In one example, tuning active segment 230 may have dimensions that may cause electrical fields in perimeter active segment 210 to exhibit desired properties (e.g., rotating for RHCP bands) corresponding to desired properties in the current in perimeter active segment 210.

As detailed above, a circularly-polarized (CP) antenna may be used in GPS systems as it may reduce distortion caused by multipath as well as reduce losses due to polarization mismatch caused by Faraday rotation when transmitting and receiving signals. In situations where the orientation of the antenna/device is frequently changing, such as with mobile phones, a linearly polarized (LP) antenna may be more suitable as it may be rotation-independent. However, in situations where the antenna/device orientation is generally fixed, such as in vehicles, aircraft, head-mounted or head-worn devices, a RHCP antenna may be used. However, compared to LP antennas, it may be more challenging to design CP antennas given that the impedance bandwidth and the axial ratio (AR) bandwidth are not typically fully coincident.

Optically transparent conductors may allow fabricating transparent antennas. Optically transparent conductors for example in the form of metal mesh (MM) may allow visible light to pass through while simultaneously enabling the conduction at a desired radio frequency spectrum. In some examples, MM may exhibit substantially lower sheet resistivity compared to other transparent conductors such as, indium tin oxide (ITO), or Aluminum zinc oxide (AZO) such that MM may be a suitable candidate for use as a conductor in high-frequency RF applications. Additionally, the utilization of MM in the design of antennas may provide design freedom, as it enables the concealment of the physical configuration of the antenna through the division of the MM into active and dummy sections. Accordingly, antennas may be incorporated on a lens of a glasses form factor device, which is often the largest component within the glasses form factor, to advantageously release the space previously occupied by the LDS, flex, or PCB type antennas. In addition, the present disclosure provides a uniplanar design with simple feeding to advantageously minimize or otherwise reduce the complexity of integrating transparent MM onto a lens through lamination.

As described herein, a uniplanar antenna radiating structure constructed from transparent metal mesh (MM) may be divided into active and dummy/floating segments through precise incision. For example, a denser first active MM segment may be applied around the perimeter of the transparent MM. The contour of MM segment #1 may be designed such that a majority of the surface currents at its two sides may be perpendicular to the other two sides.

The antenna may be excited by a second active MM segment which may be connected to a coplanar waveguide (CPW) feed to capacitively feed the first MM segment. A third active MM segment may be connected to the first active MM segment and, in some examples, located at same side corner as the second active MM segment. The two sides of the third active MM segment may be parallel with a majority of the first active MM segment such that the current at the two open edges of the third active MM segment may also be orthogonal to each other. By adjusting the dimension of these two edges of the third active MM segment, a 90 degree phase difference between two orthogonal E-field components may be generated when the antenna is resonance at the desired frequency (e.g., GPS L1 band 1575.42 MHz-1609.31 MHz).

In some examples, the predominant E-field components (e.g., disregarding the weaker currents) at four time instants: ωt=0°, 90°, 180°, 270° may be Ey+, Ex+, Ey−, Ex−, which may indicate that the current in the edges may rotate counter-clockwise as the time phase increases, further demonstrating that the fields radiating in the +z direction may be RHCP. Moreover, in some examples, a good RHCP radiation (e.g., AR<3) may be maintained for the described antenna at 65° elevation angle towards the upper hemisphere (e.g., with respect to a glasses form factor device on a user's head) even in the presence of a head phantom.

EXAMPLE EMBODIMENTS

Example 1: A device comprising a uniplanar transparent conductive material forming an antenna comprising an active segment, and a dummy segment.

Example 2: The device of Example 1, wherein the active segment comprises a first edge connected to a second edge, and a first surface current of the first edge is substantially perpendicular to a second surface current of the second edge.

Example 3: The device of Example 2, further comprising a tuning active segment configured with dimensions to create a substantially 90-degree phase difference between the first surface current and the second surface current when the antenna resonates at a desired frequency.

Example 4: The device of Example 3, further comprising a capacitive active segment to capacitively feed the active segment, wherein the capacitive active segment is separated from the active segment by the dummy segment.

Example 5: The device of Example 4, wherein the capacitive active segment is coupled to a coplanar waveguide (CPW) feed.

Example 6: The device of Example 4 or 5, wherein the capacitive active segment is located on a same side as the tuning active segment with respect to the antenna.

Example 7: The device of any of Examples 1-6, wherein the uniplanar transparent conductive material comprises a metal mesh material.

Example 8: The device of Example 7, wherein the active segment corresponds to a perimeter of the antenna that at least partially surrounds the dummy segment.

Example 9: The device of Example 8, wherein the active segment at least partially surrounds at least one other active segment.

Example 10: The device of Example 9, wherein a density of the metal mesh material for the active segment is denser than a density of the metal mesh material for the at least one other active segment.

Example 11: The device of any of Examples 7-10, wherein the active segment corresponds to a closed circuit structure of the metal mesh material and the dummy segment corresponds to an open circuit structure of the metal mesh material.

Example 12: The device of any of Examples 7-11, wherein the dummy segment comprises the metal mesh material having cut cells.

Example 13: A system comprising at least one physical processor, physical memory comprising computer-executable instructions, and an antenna comprising: a substrate, and a uniplanar transparent conductive material on the substrate comprising: an active segment, and a dummy segment.

Example 14: The system of Example 13, wherein the antenna further comprises: a capacitive active segment to capacitively feed the active segment, and a tuning active segment configured with dimensions to create a substantially 90-degree phase difference between a first surface current of a first edge of the active segment and a second surface current of a second edge of the active segment, when the antenna resonates at a desired frequency.

Example 15: The system of Example 14, wherein: the active segment corresponds to a perimeter of the antenna that at least partially surrounds the dummy segment, the capacitive active segment, and the tuning active segment; the capacitive active segment is separated from the active segment and the tuning active segment by the dummy segment; the active segment comprises the first edge connected to the second edge; and the first surface current of the first edge is substantially perpendicular to the second surface current of the second edge.

Example 16: The system of Example 15, wherein the capacitive active segment is located on a same side as the tuning active segment within the perimeter of the antenna.

Example 17: The system of any of Examples 14-16, wherein: the uniplanar transparent conductive material comprises a metal mesh material; and a density of the metal mesh material for the active segment is denser than a density of the metal mesh material for the tuning active segment and the capacitive active segment.

Example 18: The system of Example 17, wherein the active segment corresponds to a closed circuit structure of the metal mesh material and the dummy segment corresponds to an open circuit structure of the metal mesh material.

Example 19: A method comprising: (i) receiving a signal by a capacitive active segment of an antenna from a waveguide device, and (ii) capacitively feeding a perimeter active segment of the antenna based on the received signal, wherein the capacitive active segment is conductively separated from the perimeter active segment by a dummy segment, and wherein the antenna comprises a uniplanar transparent conductive material on a substrate.

Example 20: The method of Example 19, further comprising generating a substantially 90-degree phase difference between a first electric field component of a first edge of the perimeter active segment and a second electric field component of a second edge of the perimeter active segment using a tuning active segment coupled to the first and second edges when the antenna resonates at a desired frequency.

Embodiments of the present disclosure may include or be implemented in-conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 800 in FIG. 8) or that visually immerses a user in an artificial reality (such as, e.g., virtual-reality system 905 in FIG. 9). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 8:
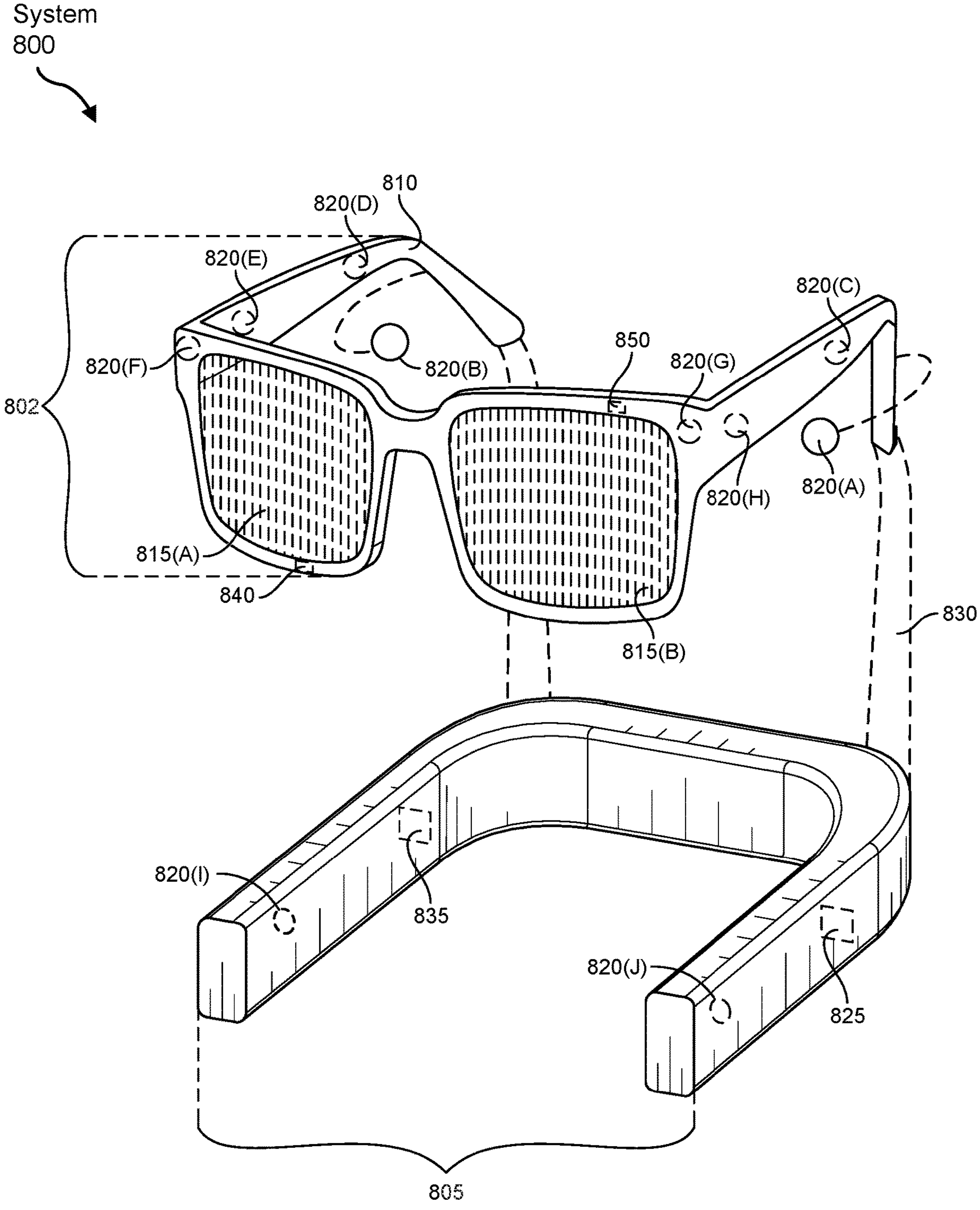
FIG. 8 is an illustration of exemplary augmented-reality glasses that may be used in connection with embodiments of this disclosure.
Figure 9:
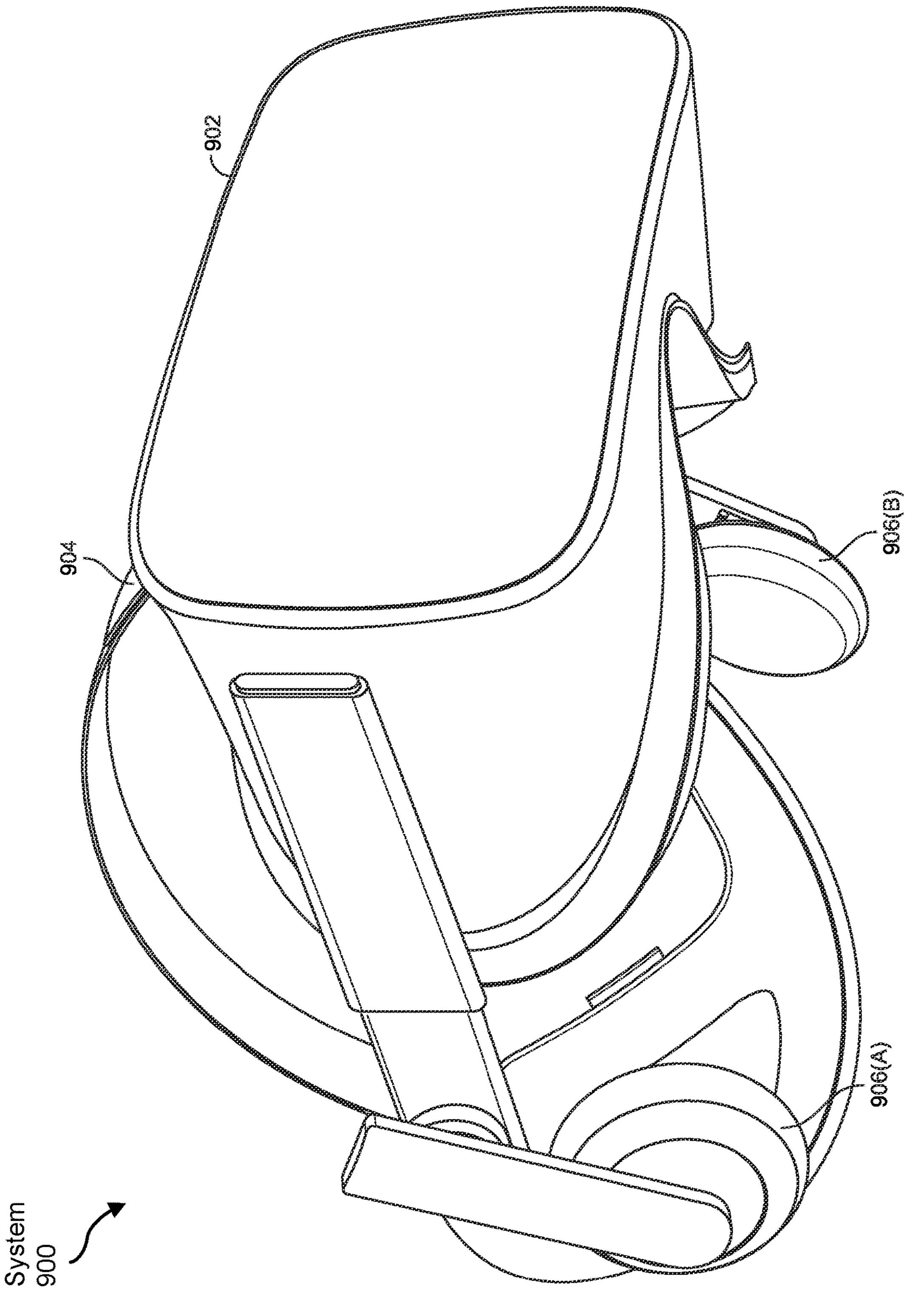
FIG. 9 is an illustration of an exemplary virtual-reality headset that may be used in connection with embodiments of this disclosure.

Turning to FIG. 8, augmented-reality system 800 may include an eyewear device 802 with a frame 810 configured to hold a left display device 815(A) and a right display device 815(B) in front of a user's eyes. Display devices 815(A) and 815(B) may act together or independently to present an image or series of images to a user. While augmented-reality system 800 includes two displays, embodiments of this disclosure may be implemented in augmented-reality systems with a single NED or more than two NEDs.

In some embodiments, augmented-reality system 800 may include one or more sensors, such as sensor 840. Sensor 840 may generate measurement signals in response to motion of augmented-reality system 800 and may be located on substantially any portion of frame 810. Sensor 840 may represent one or more of a variety of different sensing mechanisms, such as a position sensor, an inertial measurement unit (IMU), a depth camera assembly, a structured light emitter and/or detector, or any combination thereof. In some embodiments, augmented-reality system 800 may or may not include sensor 840 or may include more than one sensor. In embodiments in which sensor 840 includes an IMU, the IMU may generate calibration data based on measurement signals from sensor 840. Examples of sensor 840 may include, without limitation, accelerometers, gyroscopes, magnetometers, other suitable types of sensors that detect motion, sensors used for error correction of the IMU, or some combination thereof.

In some examples, augmented-reality system 800 may also include a microphone array with a plurality of acoustic transducers 820(A)-820(J), referred to collectively as acoustic transducers 820. Acoustic transducers 820 may represent transducers that detect air pressure variations induced by sound waves. Each acoustic transducer 820 may be configured to detect sound and convert the detected sound into an electronic format (e.g., an analog or digital format). The microphone array in FIG. 8 may include, for example, ten acoustic transducers: 820(A) and 820(B), which may be designed to be placed inside a corresponding ear of the user, acoustic transducers 820(C), 820(D), 820(E), 820(F), 820(G), and 820(H), which may be positioned at various locations on frame 810, and/or acoustic transducers 820(I) and 820(J), which may be positioned on a corresponding neckband 805.

In some embodiments, one or more of acoustic transducers 820(A)-(J) may be used as output transducers (e.g., speakers). For example, acoustic transducers 820(A) and/or 820(B) may be earbuds or any other suitable type of headphone or speaker.

The configuration of acoustic transducers 820 of the microphone array may vary. While augmented-reality system 800 is shown in FIG. 8 as having ten acoustic transducers 820, the number of acoustic transducers 820 may be greater or less than ten. In some embodiments, using higher numbers of acoustic transducers 820 may increase the amount of audio information collected and/or the sensitivity and accuracy of the audio information. In contrast, using a lower number of acoustic transducers 820 may decrease the computing power required by an associated controller 850 to process the collected audio information. In addition, the position of each acoustic transducer 820 of the microphone array may vary. For example, the position of an acoustic transducer 820 may include a defined position on the user, a defined coordinate on frame 810, an orientation associated with each acoustic transducer 820, or some combination thereof.

Acoustic transducers 820(A) and 820(B) may be positioned on different parts of the user's ear, such as behind the pinna, behind the tragus, and/or within the auricle or fossa. Or, there may be additional acoustic transducers 820 on or surrounding the ear in addition to acoustic transducers 820 inside the ear canal. Having an acoustic transducer 820 positioned next to an ear canal of a user may enable the microphone array to collect information on how sounds arrive at the ear canal. By positioning at least two of acoustic transducers 820 on either side of a user's head (e.g., as binaural microphones), augmented-reality device 800 may simulate binaural hearing and capture a 3D stereo sound field around about a user's head. In some embodiments, acoustic transducers 820(A) and 820(B) may be connected to augmented-reality system 800 via a wired connection 830, and in other embodiments acoustic transducers 820(A) and 820(B) may be connected to augmented-reality system 800 via a wireless connection (e.g., a BLUETOOTH connection). In still other embodiments, acoustic transducers 820(A) and 820(B) may not be used at all in conjunction with augmented-reality system 800.

Acoustic transducers 820 on frame 810 may be positioned in a variety of different ways, including along the length of the temples, across the bridge, above or below display devices 815(A) and 815(B), or some combination thereof. Acoustic transducers 820 may also be oriented such that the microphone array is able to detect sounds in a wide range of directions surrounding the user wearing the augmented-reality system 800. In some embodiments, an optimization process may be performed during manufacturing of augmented-reality system 800 to determine relative positioning of each acoustic transducer 820 in the microphone array.

In some examples, augmented-reality system 800 may include or be connected to an external device (e.g., a paired device), such as neckband 805. Neckband 805 generally represents any type or form of paired device. Thus, the following discussion of neckband 805 may also apply to various other paired devices, such as charging cases, smart watches, smart phones, wrist bands, other wearable devices, hand-held controllers, tablet computers, laptop computers, other external compute devices, etc.

As shown, neckband 805 may be coupled to eyewear device 802 via one or more connectors. The connectors may be wired or wireless and may include electrical and/or non-electrical (e.g., structural) components. In some cases, eyewear device 802 and neckband 805 may operate independently without any wired or wireless connection between them. While FIG. 8 illustrates the components of eyewear device 802 and neckband 805 in example locations on eyewear device 802 and neckband 805, the components may be located elsewhere and/or distributed differently on eyewear device 802 and/or neckband 805. In some embodiments, the components of eyewear device 802 and neckband 805 may be located on one or more additional peripheral devices paired with eyewear device 802, neckband 805, or some combination thereof.

Pairing external devices, such as neckband 805, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 800 may be provided by a paired device or shared between a paired device and an eyewear device, thus reducing the weight, heat profile, and form factor of the eyewear device overall while still retaining desired functionality. For example, neckband 805 may allow components that would otherwise be included on an eyewear device to be included in neckband 805 since users may tolerate a heavier weight load on their shoulders than they would tolerate on their heads. Neckband 805 may also have a larger surface area over which to diffuse and disperse heat to the ambient environment. Thus, neckband 805 may allow for greater battery and computation capacity than might otherwise have been possible on a stand-alone eyewear device. Since weight carried in neckband 805 may be less invasive to a user than weight carried in eyewear device 802, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 805 may be communicatively coupled with eyewear device 802 and/or to other devices. These other devices may provide certain functions (e.g., tracking, localizing, depth mapping, processing, storage, etc.) to augmented-reality system 800. In the embodiment of FIG. 8, neckband 805 may include two acoustic transducers (e.g., 820(I) and 820(J)) that are part of the microphone array (or potentially form their own microphone subarray). Neckband 805 may also include a controller 825 and a power source 835.

Acoustic transducers 820(I) and 820(J) of neckband 805 may be configured to detect sound and convert the detected sound into an electronic format (analog or digital). In the embodiment of FIG. 8, acoustic transducers 820(I) and 820(J) may be positioned on neckband 805, thereby increasing the distance between the neckband acoustic transducers 820(I) and 820(J) and other acoustic transducers 820 positioned on eyewear device 802. In some cases, increasing the distance between acoustic transducers 820 of the microphone array may improve the accuracy of beamforming performed via the microphone array. For example, if a sound is detected by acoustic transducers 820(C) and 820(D) and the distance between acoustic transducers 820(C) and 820(D) is greater than, e.g., the distance between acoustic transducers 820(D) and 820(E), the determined source location of the detected sound may be more accurate than if the sound had been detected by acoustic transducers 820(D) and 820(E).

Controller 825 of neckband 805 may process information generated by the sensors on neckband 805 and/or augmented-reality system 800. For example, controller 825 may process information from the microphone array that describes sounds detected by the microphone array. For each detected sound, controller 825 may perform a direction-of-arrival (DOA) estimation to estimate a direction from which the detected sound arrived at the microphone array. As the microphone array detects sounds, controller 825 may populate an audio data set with the information. In embodiments in which augmented-reality system 800 includes an inertial measurement unit, controller 825 may compute all inertial and spatial calculations from the IMU located on eyewear device 802. A connector may convey information between augmented-reality system 800 and neckband 805 and between augmented-reality system 800 and controller 825. The information may be in the form of optical data, electrical data, wireless data, or any other transmittable data form. Moving the processing of information generated by augmented-reality system 800 to neckband 805 may reduce weight and heat in eyewear device 802, making it more comfortable to the user.

Power source 835 in neckband 805 may provide power to eyewear device 802 and/or to neckband 805. Power source 835 may include, without limitation, lithium ion batteries, lithium-polymer batteries, primary lithium batteries, alkaline batteries, or any other form of power storage. In some cases, power source 835 may be a wired power source. Including power source 835 on neckband 805 instead of on eyewear device 802 may help better distribute the weight and heat generated by power source 835.

As noted, some artificial-reality systems may instead of blending an artificial reality with actual reality, substantially replace one or more of a user's sensory perceptions of the real world with a virtual experience. One example of this type of system is a head-worn display system, such as virtual-reality system 905 in FIG. 9, that mostly or completely covers a user's field of view. Virtual-reality system 905 may include a front rigid body 902 and a band 904 shaped to fit around a user's head. Virtual-reality system 905 may also include output audio transducers 906(A) and 906(B). Furthermore, while not shown in FIG. 9, front rigid body 902 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 800 and/or virtual-reality system 905 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 800 and/or virtual-reality system 905 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 800 and/or virtual-reality system 905 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

Some augmented-reality systems may map a user's and/or device's environment using techniques referred to as "simultaneous location and mapping" (SLAM). SLAM mapping and location identifying techniques may involve a variety of hardware and software tools that can create or update a map of an environment while simultaneously keeping track of a user's location within the mapped environment. SLAM may use many different types of sensors to create a map and determine a user's position within the map.

SLAM techniques may for example, implement optical sensors to determine a user's location. Radios including WiFi, BLUETOOTH, global positioning system (GPS), cellular or other communication devices may be also used to determine a user's location relative to a radio transceiver or group of transceivers (e.g., a WiFi router or group of GPS satellites). Acoustic sensors such as microphone arrays or 2D or 3D sonar sensors may also be used to determine a user's location within an environment. Augmented-reality and virtual-reality devices (such as systems 800 and 900 of FIGS. 8 and 9, respectively) may incorporate any or all of these types of sensors to perform SLAM operations such as creating and continually updating maps of the user's current environment. In at least some of the embodiments described herein, SLAM data generated by these sensors may be referred to as "environmental data" and may indicate a user's current environment. This data may be stored in a local or remote data store (e.g., a cloud data store) and may be provided to a user's AR/VR device on demand.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A device comprising:
an antenna comprising:
a substrate, and a uniplanar transparent conductive material on the substrate comprising:
an active segment;
a dummy segment; and
a capacitive active segment to capacitively feed the active segment, wherein the capacitive active segment is separated from the active segment by the dummy segment and is coupled to a coplanar waveguide (CPW) feed.

2. The device of claim 1, wherein the active segment comprises a first edge connected to a second edge, and a first surface current of the first edge is substantially perpendicular to a second surface current of the second edge.

3. The device of claim 2, further comprising a tuning active segment configured with dimensions to create a substantially 90-degree phase difference between the first surface current and the second surface current when the antenna resonates at a desired frequency.

4. The device of claim 3, further wherein the capacitive active segment is located proximate to a tuning active segment within the antenna.

5. The device of claim 4, wherein the dummy segment comprises a metal mesh material having one or more cells forming an open-circuit structure.

6. The device of claim 4, wherein the capacitive active segment is located on a same side as the tuning active segment with respect to the antenna.

7. The device of claim 1, wherein the uniplanar transparent conductive material comprises a metal mesh material.

8. The device of claim 7, wherein the active segment corresponds to a perimeter of the antenna that at least partially surrounds the dummy segment.

9. The device of claim 8, wherein the active segment at least partially surrounds at least one other active segment.

10. The device of claim 9, wherein a density of the metal mesh material for the active segment is denser than a density of the metal mesh material for the at least one other active segment.

11. The device of claim 7, wherein the active segment corresponds to a closed- circuit structure of the metal mesh material and the dummy segment corresponds to an open circuit structure of the metal mesh material.

12. The device of claim 7, wherein the dummy segment comprises the metal mesh material having cut cells.

13. A system comprising:
at least one physical processor;
physical memory comprising computer-executable instructions; and
an antenna comprising:
a substrate; and
a uniplanar transparent conductive material on the substrate comprising:
an active segment;
a dummy segment; and
a capacitive active segment to capacitively feed the active segment, wherein the capacitive active segment is coupled to a coplanar waveguide (CPW) feed and is separated from the active segment by the dummy segment.

14. The system of claim 13, wherein the antenna further comprises:

a tuning active segment configured with dimensions to create a substantially 90-degree phase difference between a first surface current of a first edge of the active segment and a second surface current of a second edge of the active segment, when the antenna resonates at a desired frequency.

15. The system of claim 14, wherein:

the active segment corresponds to a perimeter of the antenna that at least partially surrounds the dummy segment, the capacitive active segment, and the tuning active segment;

the capacitive active segment is separated from the active segment and the tuning active segment by the dummy segment;

the active segment comprises the first edge connected to the second edge; and the first surface current of the first edge is substantially perpendicular to the second surface current of the second edge.

16. The system of claim 15, wherein the capacitive active segment is located on a same side as the tuning active segment within the perimeter of the antenna.

17. The system of claim 14, wherein:

the uniplanar transparent conductive material comprises a metal mesh material; and a density of the metal mesh material for the active segment is denser than a density of the metal mesh material for the tuning active segment and the capacitive active segment.

18. The system of claim 17, wherein the active segment corresponds to a closed-circuit structure of the metal mesh material and the dummy segment corresponds to an open circuit structure of the metal mesh material.

19. A method comprising:

receiving a signal by a capacitive active segment of an antenna from a waveguide device; and capacitively feeding a perimeter active segment of the antenna based on the received signal;

wherein the capacitive active segment is conductively separated from the perimeter active segment by a dummy segment, the capacitive segment to capacitively feed the active segment, wherein the capacitive active segment is coupled to a coplanar waveguide (CPW) feed, and wherein the antenna comprises a uniplanar transparent conductive material on a substrate.

20. The method of claim 19, further comprising generating a substantially 90-degree phase difference between a first electric field component of a first edge of the perimeter active segment and a second electric field component of a second edge of the perimeter active segment using a tuning active segment coupled to the first and second edges when the antenna resonates at a desired frequency.

* * * * *